Nov. 13, 1934.   R. T. SMITH   1,980,766
INTERMITTENT CYCLING SWITCH FOR ELECTRICAL CIRCUITS
Filed Jan. 16, 1933   2 Sheets-Sheet 1

Inventor
R. T. Smith
By Albert E. Dieterich
Attorney

Nov. 13, 1934.    R. T. SMITH    1,980,766
INTERMITTENT CYCLING SWITCH FOR ELECTRICAL CIRCUITS
Filed Jan. 16, 1933    2 Sheets-Sheet 2
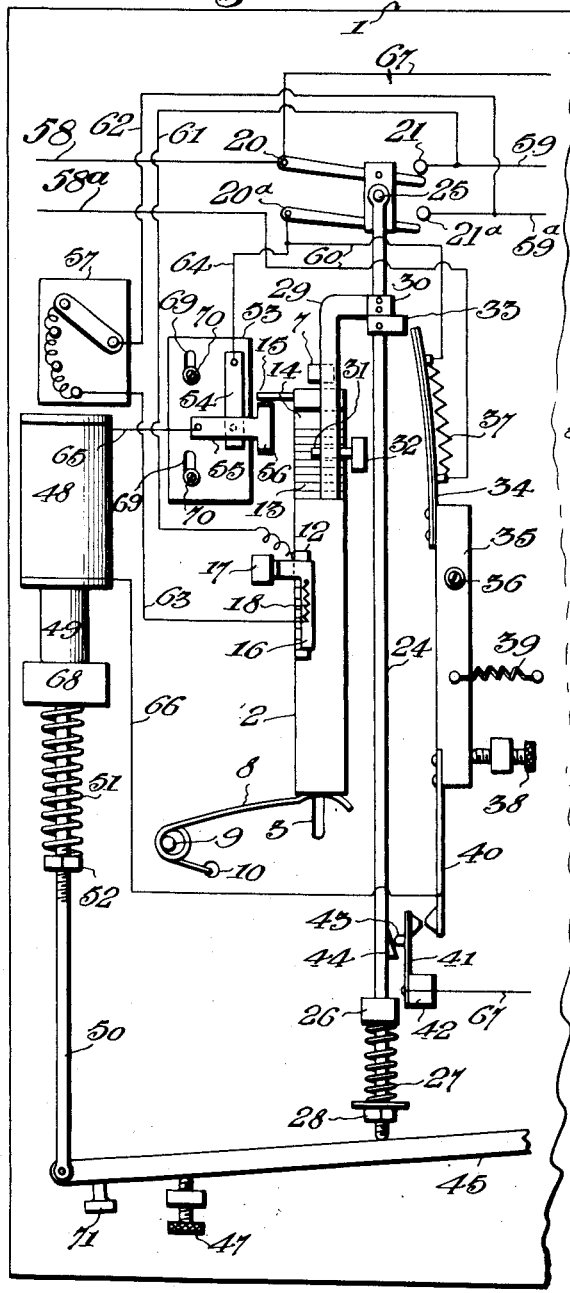
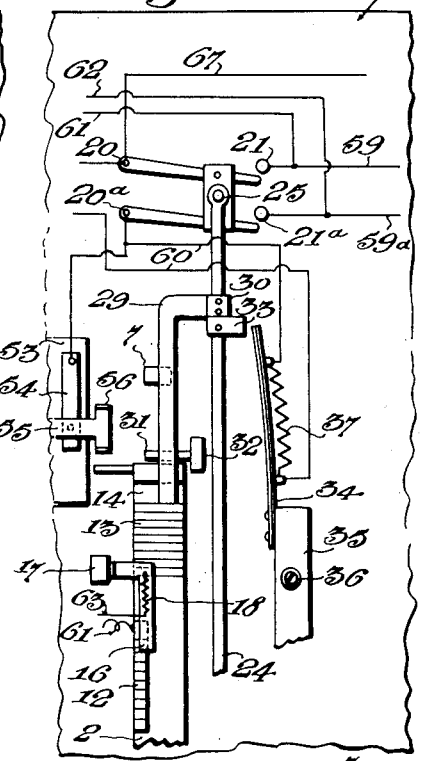
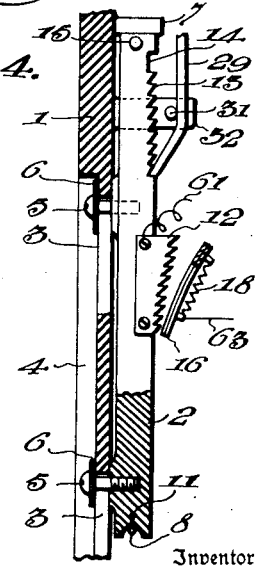
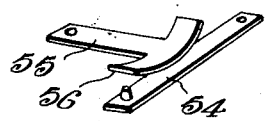
Inventor
R. T. Smith
By Albert E. Dieterich
Attorney Patented Nov. 13, 1934

1,980,766

UNITED STATES PATENT OFFICE 1,980,766

INTERMITTENT CYCLING SWITCH FOR ELECTRICAL CIRCUITS

Reuben Theodore Smith, Newton, Miss.

Application January 16, 1933, Serial No. 652,085

17 Claims. (Cl. 175—294)

My invention relates to a reclosing and lock-out or intermittent cycling switch for electrical circuits.

When loaded to or above the current flow for which it is built or set, the switch trips (opens the circuit) and recloses the number of times for which it has been adjusted and then locks out until reset by hand. After having been reset by hand the number of times for which the switch was built, if the loaded condition still persists, the switch will continue to cycle on and off continuously so long as the load is sufficient to cause the switch to open.

Should the load be reduced below the tripping-out load, or should the trouble which caused the switch to open be repaired, upon the switch being closed, either automatically or by hand, the apparatus will reset itself to trip and reclose the predetermined number of times before locking out, should the load again increase beyond the tripping value or should trouble in the circuits protected by the switch again develop.

An object of the invention is to provide a switch of the character referred to, which is of a simple, rugged, inexpensive and compact construction and which will readily and effectively serve its intended purposes.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 2 is a view similar to Figure 1, showing the position of the parts just after the switch 19 has been opened.

Figure 3 is a detail diagrammatic view with the parts positioned to cycle continuously so long as the load line is overloaded.

Figure 4 is a detail vertical section showing how the bar 2 may be mounted.

Figure 5 is a detail perspective view of the contact members 54 and 55 separated.

Figure 1:
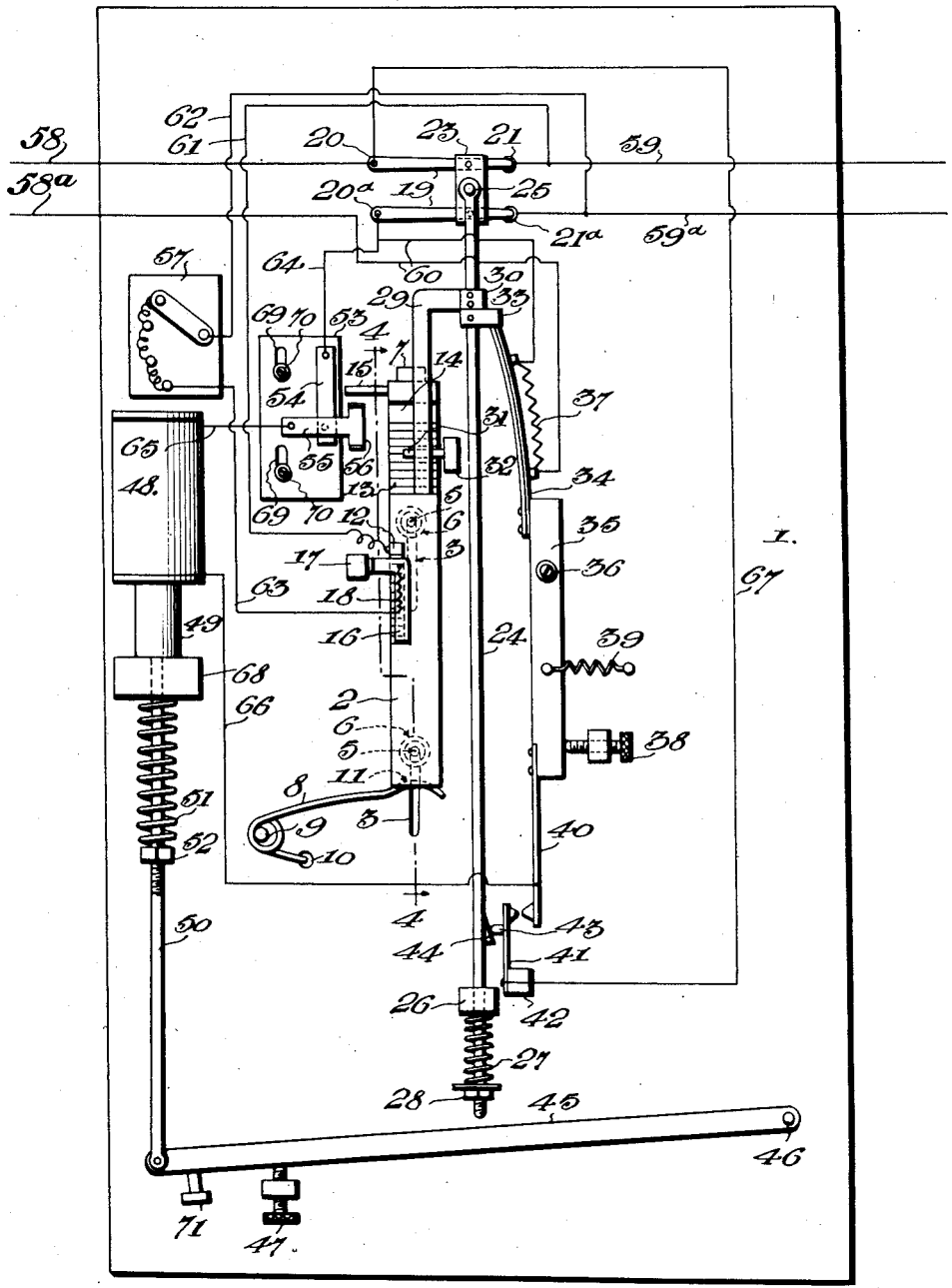
Figure 1 is an elevation of the switch with the parts in normal position and set to cycle four times before locking out; the line and load wires being indicated.

In the drawings I have shown but one embodiment of my invention although it will be obvious later that changes and variations in the structure, arrangement and proportion of parts, as well as mechanical details, can readily be made without departing from the invention and the scope of the appended claims. Like numerals and letters of reference designate like parts in all of the figures of the drawings in which 1 is the base or panel on which the operative parts of my invention are mounted. A rack bar 2 is constructed preferably of bakelite, vulcanized fibre, or other suitable insulation, and is mounted to slide vertically (endwise) on the panel in any suitable way as, for instance, by screws 5 and washers 6, the screws passing through slots 3 in the panel, the washers and screw-heads being located within recesses 4 in the back of the panel 1. The upward movement of the bar 2 is limited by a stop 7 on the panel and is effected by a spring 8 which is coiled around a pin 9 and has one of its ends engaging in a hole 10 in the panel while its other end lies in recess 11 in the lower end of the bar 2.

A stepped plate 12 of conducting material is secured to the bar 2. The lower end of this plate is flush with the bar and the upper end is raised or projected from the face of the bar for a purpose presently understood.

The bar 2 is also provided with feed ratchet teeth 13 and a blanking recess 14 to cooperate with the pawl 29 that operates the rack bar step by step.

The rack bar 2 carries a pin 15 for opening and holding open the circuit of the switch-closing magnet 48 after the bar has been stepped a predetermined number of times, as will later more fully appear.

Mounted at 17 is a bi-metallic bar-latching or back-check pawl 16 which has an electric heater 18 to affect its action at times.

The main line switch which is to be periodically opened and closed may be of any approved type. For convenience of illustration, however, I have shown it as a two-blade switch 19, the blades of which are pivoted at 20—20a and engage respectively with fixed contacts 21—21a. These blades are connected by an insulating cross bar 22 which is pivoted to the blades at 23.

The switch-operating rod 24 has its upper end pivoted at 25 to the bar 22 and its lower portion guided in a bearing 26, there being a switch-opening spring 27 located on the rod 24. The tension of the spring is regulated by nut 28.

The rack-bar stepping pawl 29 is rigidly mounted at 30 on the rod 24 and overlies the pawl-lifting finger 31 which is mounted on the panel at 32 and serves to permit the pawl 29 to operate the rack-bar 2 only one step or notch at a time. Finger 31 also serves to lift pawl 29 away from rack-bar 2 when switch 19 is in the closed position to allow rack-bar to return to its normal position against stop 7 upon the rack-bar being released by latching-pawl 16.

The rod 24 also carries a stop 33 (preferably of insulation) with which the bi-metallic rod-holding finger 34 cooperates. The finger 34 is securely mounted on the rocking lever 35 (preferably constructed of insulation) and pivotally mounted at 36 on the panel. The finger 34 normally engages the under side of the stop 33 and holds the rod 24 up with switch 19 closed. A spring 39 holds lever 35 against an adjustable stop 38.

The lever 35 at the lower end carries contact finger 40 which is adapted to cooperate at times with the stationary contact 41 to close the switch-closing magnet circuit. Normally the contacts 40 and 41 do not engage one another.

The bi-metallic finger 34 carries or is adjacent to an electric heater 37, the purpose of which will soon appear.

The contact 41 is mounted at 42 and has a button 43 that cooperates with a cam 44 on the rod 24, as will later appear.

Rod-lifting and switch-closing lever 45 is fulcrumed at 46 and is adapted for engagement with the end of the rod 24 to lift it. An adjustable stop 47 is provided against which the lever 45 normally rests.

A solenoid magnet 48 is mounted on the panel and has its core 49 connected by rod 50 to lever 45, the rod 50 passing through a bearing 68 and carrying a spring 51 and a tension nut 52, the spring serving to hold the lever 45 down against stop 47.

A block 53 is mounted on the panel 1 so as to be adjustable up and down. This may be accomplished by slotting the block as at 69 and providing cap screws or bolts 70 to hold it in place. The block 53 carries the fixed contact 54 and the spring contact 55. These contacts normally lie in engagement with one another. The spring contact 55 has a shoe 56 to be engaged by the pin 15 at times for the purpose of separating contact 55 from contact 54 to open the magnet circuit. Contact 54 is connected by wire 64 to terminal 20a, and contact 55 is connected by wire 65 to magnet 48.

A rheostat or resistor 57 is connected by wire 62 to one load wire 59a and by wire 63 to heater 18, the latter being connected to pawl 16.

The heater 37 is connected (preferably in series) with line wire 58a by wires 60.

The ratchet plate 12 is connected by wire 61 to load wire 59. The wire 66 connects magnet 48 to contact finger 40, while wire 67 connects contact 41 with line wire 58.

*Operation*

Assume that the parts are positioned as shown in Figure 1 with the block 53 so adjusted that four steps of the bar 2 may occur before finger 15 engaging shoe 56 will raise contact 55 and open magnet circuit at that point.

Also assume that the switch is closed and a normal load is on the wires 59—59a.

Now should an overload occur, the additional current passing through the heater 37 will affect the bi-metallic rod-holding finger 34 and cause it to straighten out or move away from rod 24 and from under stop 33. Spring 39 still holds lever 35 against stop 38 leaving the circuit open between 40 and 41. When the switch 19 is closed and the current in the load line is passing through heater 18 it causes bi-metallic pawl 16 to leave the ratchet plate 12.

When ratchet bar 2 is against stop 7 strip 16 rests upon insulation below ratchet 12, but in any other position of ratchet bar 2 strip 16 rests (after switch 19 closes) upon the metal insert ratchet plate 12. Upon the closing of switch 19 current flows from the load side of the switch through ratchet 12, strip 16, heater 18, through adjustable resistance 57 to load side of switch 19, thus completing the circuit through the heater 18 and heating the strip 16, which strip bends out and disengages notched plate 12 which allows spring 8 to return bar 2 to its normal position against stop 7, so that a predetermined number of trippings and reclosings of the switch 19 may again take place before the lock-out position of ratchet 2 is reached.

After the overload current has effected the release of rod 24 and the switch 19 has opened, the current in heater 18 is cut off with the result that the bi-metallic pawl 16 bends in and engages the bar 2 or ratchet plate 12 with which it may be in cooperation.

The bar 2 of course cannot move upwardly while it is held down by pawl 29 engaging ratchet teeth 13.

The opening of the switch 19 also breaks the circuit through heater 37 which allows bi-metallic finger 34 to cool again and therefore bend back toward the position shown in Figure 1. However, since rod 24 is down, in bending back the finger 34 will engage the right-hand end of the stop 33 and consequently the lever 35 will be rocked out of engagement with the stop 38 and the circuit closed between 40 and 41, thereby energizing magnet 48 which sucks up its core armature 49 and recloses the switch 19 by shoving the rod 24 upwardly. This movement is accomplished, however, while pawl 16 still engages rock 12. The up-thrust of the rod 24 causes cam 44 to engage knob 43 and make sure that the circuit remains closed between 40 and 41 long enough for the magnet to operate before finger 34 slips under stop 33 and spring 39 draws lever 35 back against stop 38, thereby opening the circuit again at 40—41 and de-energizing the magnet 48. If the overload is still on the line the foregoing cycle of operations is repeated up to four times. At the end of the fourth cycle pin 15 will have engaged shoe 56 and opened the magnet circuit so that it cannot reset the rod 24. This locks out the load lines. The attendant tests by reclosing the switch 19 manually by pushing up on the resetting stud 71, or in any other suitable way and if the overload is still present the switch will be opened again and remain open. The attendant can repeat this operation of closing the switch manually the number of times for which the switch is built necessary for the passing of pin 15 away from under shoe 56 after a lock-out has occurred; whereupon switch will cycle continuously so long as overload remains, this cycling being permitted by pawl 29 dropping into recess 14 after bar 13 has been stepped the number of times there are teeth on 13.

By this time pin 15 will have passed shoe 56 and contacts 55 and 54 will be again in engagement, thus enabling the apparatus to cycle indefinitely so long as the overload remains. Should the overload on wires 59 and 59a be removed the bar 2 will be released and spring 8 will raise it up again against stop 7, thereby automatically resetting the apparatus.

The time required after any closing of the switch 19 until the rack bar 2 resets to its position against the stop 7 is determined by the adjustment of the rheostat or resistance 57 and this is made progressively greater as the bar 2 is advanced away from the stop 7 by a slight taper given to the notched metal inserted plate 12.

The lever 45 may be provided with a resetting stud 71 by means of which it may be moved to reset rod 24 manually during the test resets made by the attendant after a lock-out.

By adjusting the block 53 up or down the number of cycling actions preceding the lock-out may be decreased or increased at will within the limits for which the apparatus has been designed.

From the foregoing description, taken in connection with the accompanying drawings, it is thought that the complete construction, arrangement, operation and advantages of my invention will be clear to those skilled in the art to which it relates.

What I claim is:

1. In an intermittent cycling switch, a base, a circuit switch proper connected between the service line wires and the load wires of an electric circuit, means governed by an overload on the load wires for opening and closing said switch proper periodically during the overload and for a predetermined number of cycles, means operative after said predetermined number of cycles for locking out the switch proper, and manual means to restart the opening and closing cycling of the switch proper after the lock-out while the overload persists and means for thereafter continuing the opening and closing of the switch indefinitely so long as the overload persists.

2. In an intermittent cycling switch, a base, a circuit switch proper connected between the service line wires and the load wires of an electric circuit, means governed by an overload on the load wires for opening and closing said switch proper periodically during the overload and for a predetermined number of cycles, means operative after said predetermined number of cycles for locking out the switch proper, manual means to restart the opening and closing cycling of the switch proper after the lock-out while the overload persists and means for thereafter continuing the opening and closing of the switch indefinitely so long as the overload persists, and means for restoring the aforesaid means to their original and normal positions upon removal of the overload on the load line wires.

3. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, and manual means to close the switch and effecting continuous opening and closing cycling operations again after a lock-out action and while an overload is present.

4. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, manual means to close the switch and start the cycling operations again after a lock-out action and while an overload is present, and means for thereafter repeating the opening and closing operations indefinitely so long as the overload remains.

5. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, and manual means to close the switch and effecting continuous opening and closing cycling operations again after a lock-out action and while an overload is present, said first-mentioned rod-moving means including a spring and said other means comprising a rod-lifting lever, an electromagnet for operating said lever, an electric circuit for actuating said magnet and means for controlling said last named circuit.

6. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, manual means to close the switch and start the cycling operations again after a lock-out action and while an overload is present, and means for thereafter continuing the cycling operations indefinitely so long as the overload remains, said first-mentioned rod-moving means comprising a spring and said other means including a rod-lifting lever, an electro-magnet for operating said lever, an electric circuit for actuating said magnet and means for controlling said last named circuit.

7. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position and means operable upon the occurrence of an overload on the load line wires for intermittently effecting a release of said holding means and causing action of said other means for a predetermined number of cycles of their operation, said rod-holding means including a stop on the rod and a pivoted rod-holding lever having a bi-metallic finger to engage said stop and an electric heater associated with said finger and connected with a supply line wire for actuating said finger to release it from its normal rod-latching position.

8. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, and means to lock out said other means to hold said switch open after a predetermined number of cycles of operation have taken place, said rod-holding means including a stop on the rod and a pivoted rod-holding lever having a bi-metallic finger to engage said stop and an electric heater associated with said finger and connected with a supply line wire for actuating said finger to release it from its normal rod-latching position.

9. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, and manual means to close the switch and start the cycling operations again after a lock-out action and while an overload is present, said rod-holding means including a stop on the rod and a pivoted rod-holding lever having a bi-metallic finger to engage said stop and an electric heater associated with said finger and connected with a supply line for actuating said finger to release it from its normal rod-latching position.

10. In an intermittent cycling switch, a support, supply line wire terminals and load line wire terminals carried by the support, a circuit opening and closing switch connecting the supply line terminals with the load line terminals, combined with a switch-operating rod, means to move said rod in a direction to open said switch, other means to move said rod to close said switch, means to hold said rod normally in the said closed position, means operable upon the occurrence of an overload on the load line wires for intermittently effecting a release of said holding means and causing action of said other means for a predetermined number of cycles of their operation, means to lock out said other means to hold said switch open after a predetermined number of cycles of operation have taken place, manual means to close the switch and start the cycling operations again after a lock-out action and while an overload is present, and means for thereafter continuing the cycling operations indefinitely so long as the overload remains, said rod-holding means including a stop on the rod and a pivoted rod-holding lever having a bi-metallic finger to engage said stop and an electric heater associated with said finger and connected with a supply line wire for actuating said finger to release it from its normal rod-latching position.

11. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch.

12. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch, a rack-bar, means to mount said rack-bar for longitudinal movement, a stop limiting the longitudinal movement of said bar in one direction to a normal position, means continuously tending to hold said rack-bar against said stop, a pawl carried by said switch-operating rod for engaging said rack-bar to advance it one step for each open-close cycle of the switch and a circuit opener in the magnet circuit and actuated by said rack-bar after a predetermined number of steps thereof for opening the magnet circuit to lock out the switch, and a pawl-lifting finger to lift said pawl clear of said rack-bar when the switch is in the closed position.

13. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch, a rack-bar, means to mount said rack-bar for longitudinal movement, a stop limiting the longitudinal movement of said bar in one direction to normal position, means continuously tending to hold said rack-bar against said stop, a pawl carried by said switch-operating rod for engaging said rack-bar to advance it one step for each open-close cycle of the switch, a circuit opener in the magnet circuit and actuated by said rack-bar after a predetermined number of steps thereof for opening the magnet circuit to lock out the switch, a pawl-lifting finger to lift said pawl clear of said rack-bar when the switch is in the closed position, a back check pawl for said rack-bar and means for releasing said back check pawl to free said rack-bar at predetermined times while said switch is closed.

14. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch, a rack-bar, means to mount said rack-bar for longitudinal movement, a stop limiting the longitudinal movement of said bar in one direction to normal position, means continuously tending to hold said rack-bar against said stop, a pawl carried by said switch-operating rod for engaging said rack-bar to advance it one step for each open-close cycle of the switch, a circuit opener in the magnet circuit and actuated by said rack-bar after a predetermined number of steps thereof for opening the magnet circuit to lock out the switch, a pawl-lifting finger to lift said pawl clear of said rack-bar when the switch is in the closed position, a back check pawl for said rack-bar and means for releasing said back check pawl to free said rack-bar at predetermined times while said switch is closed and an overload is present, said means serving also to release said rack-bar after the overload has been removed, and means for manually actuating said switch-actuating bar for tests after a lock-out action, thereby to cause the rack-bar to release said circuit opener, and means on the rack-bar to stop its advance movement after it has been stepped the maximum number of times for which it is designed without affecting the cycling of the switch while the overload is present.

15. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch, and a cam on said switch-operating rod to cooperate with said circuit closer to insure that the circuit remains closed long enough for said magnet to operate effectively.

16. In an intermittent cycling switch, a panel, supply line wire terminals and load line wire terminals mounted on the panel, a switch controlling passage of current between the supply line wire terminals and the load line wire terminals, a switch-operating rod, means continuously tending to move said rod to open said switch, a pivoted lever having a bi-metallic finger, a stop on said rod cooperating with said finger to hold the switch closed, a heater for the finger connected in the line wire circuit to cause the finger to bend away from the stop when the switch is closed and an overload occurs, a rod-lifting lever for moving said switch to close the switch, an electro-magnet for actuating said rod-lifting lever, an electric circuit connected to the supply line wire side of the switch and including said magnet and a circuit closer which comprises a stationary contact and a movable contact carried by said pivoted lever, the contacts being normally open, said pivoted lever when its bi-metallic finger has released the switch rod and has cooled again serving to close said contacts to energize said magnet to reclose said switch, a rack-bar, means to mount said rack-bar for longitudinal movement, a stop limiting the longitudinal movement of said bar in one direction to normal position, means continuously tending to hold said rack-bar against said stop, a pawl carried by said switch-operating rod for engaging said rack-bar to advance it one step for each open-close cycle of the switch, a circuit opener in the magnet circuit and actuated by said rack-bar after a predetermined number of steps thereof for opening the magnet circuit to lock out the switch, a pawl-lifting finger to lift said pawl clear of said rack-bar when the switch is in the closed position, a back check pawl for said rack-bar, and means for releasing said back check pawl to free said rack-bar at predetermined times while said switch is closed, said back check pawl being bi-metallic and said back check pawl releasing means including a heater associated with the pawl and means to control the action of said heater.

17. In combination with the line wires and the load wires of an electric circuit, an intermittent cycling switch comprising a circuit closing and opening switch proper, means for opening and closing said switch a predetermined number of times or cycles while the load wires are overloaded, means for locking out the switch proper after a predetermined number of cycles of switch opening and closing have occurred, manually actuated means for testing the circuit by reclosing the switch proper after it has been locked out, and means causing said switch to repeat its switch opening and closing operations, after manual testing operations, throughout the period during which the overload on the line continues.

REUBEN THEODORE SMITH.